United States Patent Office 3,092,613
Patented June 4, 1963

3,092,613
POLYMERIZATION OF ACETYLENIC COMPOUND WITH ALKALI-METAL BOROHYDRIDE AND Ni OR Co SALT
George W. Kennerly, Darien, David S. Hoffenberg, Stamford, and James S. Noland, Greenwich, Conn., assignors to American Cyanamid Company, New York, N.Y., a corporation of Maine
No Drawing. Filed July 11, 1960, Ser. No. 41,787
20 Claims. (Cl. 260—94.1)

This invention relates broadly to certain new and useful improvements in a method of polymerization. More particularly, it is concerned with a method of polymerizing a polymerizable material including (or consisting essentially of) a polymerizable compound having acetylenic (triple-bonded) unsaturation between adjacent carbon atoms, e.g., acetylene, $CH \equiv CH$, and the various mono-substituted acetylenes, $RC \equiv CH$, where R represents a monovalent substituent. Thus, the monovalent substituent represented by R can be a monovalent organic radical, examples of which are the monovalent hydrocarbon radicals and the monovalent substituted-hydrocarbon radicals. More specific examples of these radicals will be given later herein. The aforesaid polymerizable material may be a single compound having acetylenic unsaturation between a single pair or a plurality (one, two, three or any higher number) of pairs of adjacent carbon atoms; or it may be a plurality (one, two, three or any higher number that may be desired) of such compounds in any proportions; or it may be one or more of such compounds admixed with one or more other, different, polymerizable materials, e.g., polymerizable compounds having only ethylenic (double-bonded) or both ethylenic and acetylenic unsaturation between adjacent carbon atoms.

Illustrative examples of monovalent hydrocarbon radicals represented by R in the formula $RC \equiv CH$ appearing in the second sentence of the preceding paragraph are alkyl (including cycloalkyl), alkenyl (including cycloalkenyl), aralkyl, aralkenyl, aryl, alkaryl and akenylaryl. More specific examples of such radicals are methyl, ethyl, propyl, isopropyl, butyl, isobutyl, sec.-butyl, tert.-butyl, amyl to tetracontyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, fluorenyl, dinaphthylenemethyl, etc.; phenyl, biphenylyl or xenyl, naphthyl, fenchyl, phenanthryl, benzonaphthyl, anthryl, naphthyl-substituted anthryl, dianthryl and fluorenyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc.

It was known prior to the present invention to polymerize acetylene and mono-substituted acetylenes alone or admixed with each other or with other polymeriable materials containing ethylenic and/or acetylenic unsaturation between adjacent carbon atoms. It also was known that the polymerization of polymerizable materials that include a compound or compounds having acetylenic unsaturation between adjacent carbon atoms is aided (and the properties imparted to the polymer are influenced) by the particular catalyst or catalyst system employed in the polymeriation.

The present invention is especially concerned with new and unobvious improvements in the polymeriation of polymeriable materials of the kind described above and wherein the catalyst system employed comprises (a) at least one metallic salt selected from the group consisting of nickel salts and cobalt salts, e.g., nickel chloride, nickel bromide, cobalt chloride, etc., and (b) an alkali-metal borohydride, e.g., sodium borohydride ($NaBH_4$), potassium borohydride ($KBH_4$), etc.

The instant invention is based on our discovery that the particular manner in which the components of the catalyst system and the polymerizable reactant are brought together is critical in obtaining maximum yield of polymer (stated with respect to the catalyst components) with minimum consumption of the catalyst components, particularly the alkali-metal borohydride. Since the alkali-metal borohydrides are relatively expensive, anything that can be done to reduce the consumption of this component will materially reduce the cost of producing the polymers and, especially so, if such reduction in the amount required can be effected while increasing (or at least not substantially decreasing) the yield of polymer obtained.

The results of our investigations establish conclusively that an alkali-metal borohydride, specifically sodium borohydride, will react in the absence of acetylene and at a relatively rapid rate with a metallic salt of the kind used in practicing this invention, specifically nickel chloride, to give products that are not effective catalysts for the polymerization of polymerizable materials including or comprising a compound having acetylenic unsaturation between adjacent carbon atoms (hereafter, for brevity, sometimes designated generally as "acetylenic compound" or "acetylenic-containing compound"). We have also discovered that it is wasteful of alkali-metal borohydride to add it to the reaction mixture once the polymer of the acetylenic compound has started to form.

As a result of the foregoing and other discoveries of the limitations in the polymerization of acetylenic-containing compounds using catalyst systems of the kind employed in practicing this invention if one is to obtain maximum yield of useful polymer at minimum cost, we have provided a new and unobvious method for polymerizing acetylenic compounds. The process is highly efficient in effecting the polymerization reaction at atmospheric pressure; and, also, with respect to the consumption of catalyst, in the time required for completing the reaction, in the overall conversion of the monomeric acetylenic compound to a polymer thereof, in convenience, and in the relative simplicity and cost of the apparatus required.

As has been indicated hereinbefore the sequence of the steps of the method is critical. Broadly stated, our new and improved method of polymerizing a polymerizable material including a polymerizable compound having acetylenic unsaturation between adjacent carbon atoms comprises (1) distributing (e.g., dissolving and/or dispersing), in a liquid reaction medium, the said polymerizable material and at least one metallic salt selected from the group consisting of nickel salts and cobalt salts; and (2) adding an alkali-metal borohydride to and incorporating it in the resulting liquid mass, e.g., by stirring or other means of agitation. The order in which the polymerizable material and the metallic salt are distributed in the liquid reaction medium is not critical since the polymerizable material and the said salt do not react with each other. Hence they may be distributed simultaneously in the liquid reaction medium or in either order. The point at which the alkali-metal borohydride is added is, however, critical. The aforesaid polymerizable material, metallic salt and alkali-metal borohydride are each at least partly soluble in the liquid, reaction medium employed.

It is also an essential feature of the present invention that the addition of the alkali-metal borohydride to the liquid mass containing the metallic salt and the said polymerizable material is completed before any appreciable (more particularly, visually noticeable) polymerization of the said polymerizable material has occurred. The last step of the process prior to isolation of the polymer (in cases where the polymer is to be used in its isolated form) consists in allowing the polymerization of the polymerizable material to proceed to completion (or substantial completion) at a temperature not lower than −20° C.

The term "distributing" as used generally herein and in the appended claims includes within its meaning "dissolving" to form true solutions of the designated ingredient in the designated mass, as well as "dispersing" to form, for example, finely divided or colloidal dispersions of the specified ingredient in the specified mass. The term "distributing" also includes situations where both dissolving and dispersing take place, as well as the formation of admixtures wherein the additive is miscible in any and all proportions with the mass to which it has been added.

In carrying the invention into effect the acetylenic compound (alone or together with the metallic salt) is generally added to the liquid reaction medium at a temperature of from −20° C. (advantageously from about −10° C.) to, for example, about 60° or 70° C. or even 80° C. or higher. The lower temperature is critical (especially from a practical standpoint) but the upper temperature is not critical from an operative standpoint except that, in general, the yield of polymer goes down as the temperature of polymerization goes up. Usually the polymerization reaction is allowed to proceed to completion (substantial completion) at a temperature of from about 0° C. to about +60° C., and preferably within the range of from about 0° C. to about 40° or 50° C.

The liquid reaction medium employed is preferably one that has a high solubility for the acetylenic compound, as well as reasonably good solubility for both the metallic salt and the alkali-metal borohydride. One such solvent is dimethylformamide; another is N-methyl-2-pyrrolidone. As has been indicated hereinbefore the acetylenic compound, metallic salt and alkali-metal borohydride should each have at least some slight solubility in the liquid, reaction medium used in practicing this invention.

Upon completing the distribution of the acetylenic compound in the liquid, reaction medium the metallic salt (e.g., a nickel salt), if it has not previously been added to the liquid reaction medium concurrently with the addition of the acetylenic compound, is next added to said liquid medium. The molar quantity of metallic salt employed is preferably equal to at least 1/1000 of the number of moles of the acetylenic compound present in the liquid, reaction medium. It may be as much as, for example, 1/50 of the number of moles of the acetylenic compound in the liquid, reaction medium, but preferably is between 1/250 and 1/500 of the molar amount of the acetylenic compound.

Upon completing the distribution of the metallic salt in the liquid, reaction medium, e.g., a solvent, containing the acetylenic compound, the alkali-metal borohydride is added to and incorporated in the resulting liquid mass, e.g., a liquid solution. The alkali-metal borohydride may be added as a finely-divided solid, but preferably is added in the form of a dilute solution (e.g., from 0.5% to 10% by weight) of the borohydride dissolved in a liquid medium, specifically a solvent. The solvent advantageously is the same kind of liquid medium that is employed as the medium in which the acetylenic compound is distributed. The amount of alkali-metal borohydride that is added to the liquid mass containing the metallic salt and the acetylenic compound usually is such that the alkali-metal borohydride:metallic salt molar ratio is between 10:1 and 1:100, more particularly between 2:1 and 1:100. In practicing the present invention it is important that the addition of the alkali-metal borohydride be completed before any appreciable polymerization of the acetylenic compound has occurred.

Since the excess metallic salt is recoverable and reusable, it is often desirable to have an excess of the metallic salt present in the reaction mass. (By "excess" metallic salt is meant that amount of metallic salt which is above a 2:1 molar ratio of the metallic salt to the alkali-metal borohydride.)

When the polymerization reaction has proceeded to substantial completion under the temperature conditions hereinbefore specified, the polymeric reaction product is isolated from the reaction mass by conventional methods that are well known to those skilled in the art, for instance as described in the examples which follow.

We have found that, in addition to dimethylformamide and N-methyl-2-pyrrolidone, acetone is a very satisfactory solvent for the polymerization reaction when the metallic salt is acetone-soluble as are, for example, nickel bromide trihydrate and nickel nitrate hexahydrate. Since an alkali-metal borohydride reacts with carbonyl compounds, it is convenient to add the alkali-metal borohydride, specifically sodium borohydride, in a solvent such as, for instance, an alcohol and specifically ethyl alcohol which is much less reactive with an alkali-metal borohydride than is acetone. When used in this manner, any reaction between the alkali-metal borohydride and the acetone solvent is sufficiently slow that it does not interfere with the reaction between the metallic salt and the alkali-metal borohydride to form the catalytic species which is the active agent that promotes the polymerization of the acetylenic compound. Hence, acetone can properly be considered for all practical purposes, as being an inert (substantially inert), liquid, reaction medium under the conditions of the reaction.

Illustrative examples of liquids that may be used as the reaction medium are water; hydrocarbons, e.g., petroluem ether, cyclohexane, n-pentane, heptane, octane, nonane, benzene, toluene, xylene; aliphatic, cycloaliphatic or aliphatic-substituted aromatic ethers, e.g. diethyl ether, ethyl isopropyl ether, methyl heptyl ether, isopropyl phenyl ether, hexyl phenyl ether, ethyl octyl ether, 1,2-dimethoxyethane, bis-(2-methoxyethyl) ether, tetrahydrofuran, dioxane; aliphatic ketones (especially those in which the metallic salt is soluble), e.g., acetone, methyl ether ketone, ethyl hexyl ketone, etc.; aliphatic alcohols, e.g., ethanol, ispropanol, n-butanol, trimethylcarbinol, amyl alcohol, etc.; aliphatic nitriles, e.g., acetonitrile, propionitrile, etc.; and amides such as dimethylformamide, N,N-dimethylacetamide, etc. Mixtures of water with organic solvents such as those mentioned above by way of example may also be used. The chosen reaction medium or solvent, if not normally a liquid, should be liquefiable at reaction temperature. As has been indicated hereinbefore, the solvent advantageously is one which is inert (i.e., substantially inert) to the acetylenic compound, to the catalyst components and to the reaction product, more particularly polymeric reaction product, under the conditions employed in bringing the ingredients together in accordance with this invention and in allowing the polymerization reaction to proceed to substantial completion.

The concentration of the acetylenic compound in the liquid reaction medium may be considerably varied, for example from about 1% to 50% or even as high as 75% or more by weight of the total amount of the acetylenic compound plus the liquid reaction medium. The minimum amount is the extent to which the acetylenic compound dissolves in the reaction medium. The maximum amount is determined largely by practical considerations.

To the best of our knowledge and belief any polymerizable acetylenic compound of the kind described and defined hereinbefore, or any polymerizable material containing such a compound, can be polymerized by the sequence of steps and using the catalyst system that are used in practicing this invention. The preferred acetylenic compound is one represented by the general formula (I) 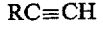 RC≡CH where R represents a member of the class consisting of H, alkyl, alkenyl, alkynyl, aralkyl, aryl, alkaryl, and cyano radicals, and mono- and poly (i.e., multi) esterified carboxy-substituted, mono- and polyhydroxy-substituted, mono- and polyalkylamino-substituted, mono- and polycyano-substituted, and mono- and polyaryloxy-substituted alkyl, alkenyl, alkynyl, aryl, alkaryl and aralkyl radicals.

Examples of compounds embraced by Formula I are acetylene itself; monomethyl through monoöctadecyl acetylenes (including the isomeric forms thereof, and the cycloalkyl acetylenes such as cyclopentyl, cyclohexyl, cycloheptyl, etc., acetylenes, and other monoalkyl acetylenes; vinylacetylene ($CH_2=CH-CH\equiv CH$), 3-vinylpropyne-1 ($CH_2=CH-CH_2-C\equiv CH$), isopropenyl acetylene

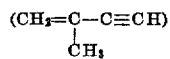

1,5 - hexadiyne [$CH\equiv C-(CH_2)_2-C\equiv CH$], 1,6-heptatadiyne [$CH\equiv C-(CH_2)_3-C\equiv CH$], 1,7-octadiyne, 1,8-nonadiyne, and other monoalkenyl acetylenes and monoalkynyl acetylenes; the benzyl, phenylethyl, phenylpropyl and other monoaralkyl acetylenes; phenyl, biphenylyl or xenyl, naphthyl and other monoaryl acetylenes; the tolyl, xylyl, ethylphenyl, propylphenyl, methyl- and dimethylnaphthyl and other monoalkaryl acetylenes. Other examples of mono-hydrocarbonacetylenes that can be homopolymerized or copolymerized with each other or with other unsaturated substances that are copolymerizable therewith will be apparent from the illustrative examples, set forth in the second paragraph of this specification, of monovalent hydrocarbon radicals represented by R in the formula $RC\equiv CH$.

Examples of compounds embraced by Formula I wherein R represents a mono-(substituted hydrocarbon) acetylene are the mono- and poly- (i.e., where the structure permits, di-, tri-, tetra-, penta- and higher multi) esterified carboxy-substituted, mono- and polyhydroxy-substituted, mono- and polyamino-substituted, mono- and polyalkylamino-substituted, mono- and polycyano-substituted and mono- and polyaryloxy-substituted alkyl, alkenyl, alkynyl, aryl, alkaryl and aralkyl acetylenes corresponding to those monohydrocarbon-substituted acetylenes given by way of example in the preceding paragraph and elsewhere herein. The specific names of some of the mono-(substituted hydrocarbon) acetylenes that can be polymerized as herein described, either alone or with other copolymerizable materials, are propargyl alcohol, propargyl acetate, ethyl propiolate, 3-butyn-1-ol, 3-butyn-2-ol, 1-ethynylcyclohexanol, 3-methyl-1-butyne-3-ol, and N,N-diethylaminomethylacetylene.

Illustrative examples of nickel and cobalt salts that can be used in practicing the present invention are nickel chloride hexahydrate, nickel bromide trihydrate, nickel nitrate hexahydrate, nickel acetate tetrahydrate, nickel naphthenate, nickel formate, nickel sulfate hexahydrate, nickel sulfate heptahydrate, nickel oxalate dihydrate, nickel orthophosphate, octahydrate, cobalt chloride dihydrate, cobalt chloride hexahydrate, cobalt bromide hexahydrate, cobalt acetate tetrahydrate, anhydrous cobalt naphthenate, anhydrous cobalt toluate, cobalt nitrate hexahydrate, cobalt formate dihydrate, cobalt oxalate and cobalt iodoplatinate monohydrate. Other examples are given in the copending applications of Lionel B. Luttinger, Serial No. 844,632, filed October 6, 1959; Serial No. 857,495, filed December 7, 1959; and Serial No. 857,498, also filed December 7, 1959. These same applications all disclose, both generically and specifically, additional examples of acetylenic compounds that can be used in practicing this invention. All of these copending applications are assigned to the same assignee as that of the present invention.

The borohydrides of sodium, potassium or any of the other alkali metals can be employed in practicing this invention.

The liquid homopolymers and copolymers resulting from the method of this invention are useful as synthetic drying oils that can be employed, for example, as components of paints, varnishes, enamels, etc. Others can be used as chemical intermediates, for instance in making polyalcohols, polymethoxides, methoxy resins, etc. They can be totally hydrogenated to form saturated aliphatic compounds. Or, they can be partly hydrogenated to yield products having both saturated and unsaturated bonds between adjacent carbon atoms and which, therefore, constitute products having properties intermediate the totally hydrogenated and non-hydrogenated polymers.

In order that those skilled in the art may better understand how the present invention can be carried into effect, the following examples are given by way of illustration and not by way of limitation. All parts and percentages are by weight unless otherwise stated.

EXAMPLE 1

In a 2-liter, 3-necked, round-bottomed flask equipped with a thermometer, gas-inlet tube, mechanical stirrer and condenser is placed 800 ml. of absolute ethanol. The ethanol is then saturated with acetylene at 25° C. and while the flow of acetylene at the rate of 0.75 mole/hr. is continued, the catalyst components, 3.57 g. (0.015 mole) of $NiCl_2.6H_2O$ and 2.83 g. (0.075 mole) of $NaBH_4$, are added to the solution as solids rapidly and consecutively. Within a few minutes the reaction mixture becomes black-brown and evolves some heat. After 2–3 hours of additional stirring and passage of acetylene gas, during which period the temperature of the reaction mass is about 30° C., the product is collected on a funnel. It is washed with benzene, acetone, dilute hydrochloric acid and finally with water. After drying there is obtained 5 g. of polyacetylene which is black in color and exhibits the characteristic infrared absorption at 1015 cm$^{-1}$. This yield (5 g.) corresponds to 12 moles of acetylene polymerized for each mole of nickel chloride hexahydrate and 2.5 moles of acetylene polymerized for each mole of sodium borohydride employed.

EXAMPLES 2–15

In the following examples the same procedure is followed as in Example 1 with the exception that in each case a different solvent is used and also, in the case of Example 15 only, a different nickel salt, viz., $NiBr_2.3H_2O$. The results are summarized in the following table:

Table I

SUMMARY OF YIELDS OF POLYACETYLENE IN EXAMPLES 2-15

| Example No. | Solvent | Grams Polyacetylene Isolated | Moles of Acetylene Polymerized per Mole of | |
|---|---|---|---|---|
| | | | $NiCl_2.6H_2O$ | $NaBH_4$ |
| 2 | Heptane | 1 | 2.5 | 0.5 |
| 3 | Acetonitrile | 4 | 10 | 2 |
| 4 | Water | 1 | 2.5 | 0.5 |
| 5 | Xylene | 5 | 12 | 2.5 |
| 6 | 50% Ethanol, 50% Water | 2 | 5 | 1 |
| 7 | Diethyl ether | 6 | 15 | 3 |
| 8 | Ethyl acetate | 14 | 36 | 7 |
| 9 | Diglyme | 16 | 41 | 8 |
| 10 | Dioxane | 9 | 23 | 5 |
| 11 | 90% Dioxane, 10% Water | 4 | 10 | 2 |
| 12 | Tetrahydrofuran | 22 | 56 | 11 |
| 13 | Dimethylformamide | 28 | 72 | 14 |
| 14 | N-methylpyrrolidone | 32 | 82 | 17 |
| 15 | Acetone [1] | 15 | 58 | 48 |

[1] Nickel salt is $NiBr_2.3H_2O$.

EXAMPLE 16

Acetone is a very satisfactory solvent for use in practicing the present invention when the nickel salt is acetone-soluble, e.g., nickel bromide trihydrate or nickel nitrate hexahydrate. Since sodium borohydride reacts with carbonyl compounds, it is convenient to add the sodium borohydride component in an ethanol solution. This reaction is sufficiently slow as not to interfere with the nickel salt-NaBH$_4$ reaction to form the catalytic species. The following procedure is illustrative:

Twenty-seven (27) grams of acetylene are dissolved in 800 ml. of acetone at 0° C. and 2.62 g. of nickel bromide trihydrate (0.0096 mole) are dissolved in the solution at 0° C. (The solubility of acetylene in acetone is greatly improved at the lower end of the temperature range hereinbefore mentioned, and hence a temperature of the order of 0°–5° C. is preferred when the solvent is acetone.) The reaction mixture is stirred and 0.456 g. (0.012 mole) NaBH$_4$ in 50 ml. of ethanol is added at once. (The reaction is very fast, as evidenced by the fact that the reaction is essentially complete in less than 5 minutes.) The product is filtered off, washed with fresh acetone, and dried in vacuo to remove all the solvent. The yield of product is 15 g., representing 57% of theoretical based on acetylene, and a ratio of 58 moles acetylene polymerized per mole of nickel bromide.

EXAMPLE 17

A five-liter flask equipped as described in Example 1 is charged with 2,400 ml. of dimethylformamide (hereafter for brevity sometimes designated as "DMF") and saturated with acetylene at about 30° C. It takes up 75 g. After completion of the saturation 1.0 g. (0.004 mole) of NiCl$_2$.6H$_2$O is added and dissolved in the solution, followed in a few minutes by 0.004 mole of NaBH$_4$ added as a 1% solution in DMF, which solution also is at a temperature of about 30° C. After about 5–10 minutes, a black solid starts to form and a mild exotherm is noted. The reaction is allowed to proceed to completion (½ hour of stirring) at a temperature not exceeding about 40° C. without further acetylene addition. The product is then collected on a funnel, washed as described in Example 1, and dried in a vacuum oven. There is isolated polyacetylene (21 g.) having the typical 1015$^{-1}$ cm. absorption found in the infrared. This yield of polyacetylene corresponds to 201 moles of acetylene polymerized for each mole of either NiCl$_2$.NH$_2$O or NaBH$_4$ employed.

EXAMPLE 18

The procedure of Example 17 is repeated except that in this case only 800 ml. of dimethylformamide solvent is employed and the reaction is carried out at 0° C. Under these conditions 55 g. of acetylene is present in the saturated solution. After carrying out the polymerization (with 0.004 mole of NiCl$_2$.6H$_2$O and 0.002 mole of NaBH$_4$) and working up the reaction mixture there is obtained 15 g. of polyacetylene. This yield of polyacetylene corresponds to 145 moles of acetylene polymerized for each mole of NiCl$_2$.6H$_2$O to 290 moles of acetylene polymerized per mole of NaBH$_4$.

EXAMPLE 19

The following example shows the lower yield of polymerized acetylene obtained per mole of NaBH$_4$ used and, also, per mole of NiCl$_2$ consumed when the metallic salt and the alkali-metal borohydride are added consecutively as finely-divided solid materials to a solvent, after which an acetylenic compound, specifically gaseous acetylene, is bubbled into the stirred mixture. The unsatisfactory results are believed to be due to the fact that the alkali-metal borohydride reacts at a relatively rapid rate with the metallic salt, specifically nickel chloride, in the absence of acetylene to give products which are ineffective catalysts for the polymerization of acetylene. This does not occur when the metallic salt is added to a liquid mass, e.g., a solution, of the acetylenic compound follower by the addition of the alkali-metal borohydride; or when the alkali-metal borohydride is added to a liquid mass, e.g., an organic or other single or mixed solvent, containing metallic salt and acetylenic compound that had been added simultaneously to the said liquid mass.

In the apparatus described in Example 1 is placed 800 ml. of dimethylformamide. To this solvent is added rapidly and consecutively as solid materials 1.0 g. of NiCl$_2$.6H$_2$O and 1.0 g. of NaBH$_4$. After stirring this mixture for five minutes, during which time the formation of black, insoluble products is noted, gaseous acetylene is bubbled into the stirred mixture at a rate of 0.75 mole/hr. for a period of three hours. Work-up of the reaction product as described in Example 1 gives 1.0 g. of polyacetylene. This yield corresponds to 9 moles of acetylene polymerized for each mole of NiCl$_2$ used and 1.4 moles of acetylene polymerized for each mole of NaBH$_4$ used.

The following example shows that it is wasteful of the alkali-metal borohydride, specifically sodium borohydride, to add it to the reaction mass once the acetylenic compound has begun to form.

EXAMPLE 20

Example 18 is repeated except that in this case, instead of working up the reaction mixture directly, it is re-saturated with acetylene, another 0.004 molar charge of NiCl$_2$.6H$_2$O is added, followed by another 0.002 molar charge of NaBH$_4$ solution, and the polymerization is allowed to proceed for an additional 30 minutes. Work-up of the resulting reaction mass yields only 18 g. of polyacetylene (compared with 15 g. obtained in one pass in Example 18).

EXAMPLE 21

In this example 0.04 mole of NiCl$_2$.6H$_2$O is dissolved in 800 ml. of acetylene-saturated DMF at 0° C. A small amount (0.002 mole) of NaBH$_4$ solution is then added to complete the polymerization in the usual manner. Work-up of the reaction mass in the usual way yields a green-colored DMF filtrate and 14 g. of polyacetylene. The filtrate is then re-saturated with acetylene, and the acetylene polymerized by adding 0.002 mole of NaBH$_4$ as a 1% solution in DMF (no additional NiCl$_2$.6H$_2$O is used). The polymerization proceeds normally to give an additional 13 g. of polyacetylene.

This example shows that one can use a relatively large excess of metallic salt, specifically nickel chloride, and that the excess salt can be recovered without harm to it and can be re-used in the process.

EXAMPLE 22

The general procedure described under Example 17 is followed. In this case, however, 0.002 mole of NiCl$_2$.6H$_2$O is used and 0.02 mole of NaBH$_4$ is employed to produce 16 grams of polyacetylene. After collection of the polyacetylene on a funnel the filtrate is resaturated with acetylene and an additional 0.004 mole of NiCl$_2$.6H$_2$O is added. No additional NaBH$_4$ is used. In these circumstances no further polyacetylene is formed.

This example shows that a relatively large excess of alkali-metal borohydride, specifically sodium borohydride, when used in the process is not recoverable as is the metallic salt, and cannot be re-used. Since any excess alkali-metal borohydride is wasted material, such excess adds materially to the cost of the process.

EXAMPLE 23

To a stirred solution of 2 g. (0.0065 mole) of nickel bromide trihydrate in 500 ml. of acetone is added 28 g. (0.5 mole) propargyl alcohol. An ethanol solution (50 ml.) containing 0.5 g. (0.013 mole) of sodium borohydride is added at once, and the reaction proceeds almost immediately to yield a black, insoluble solid which can be filtered. The product is a water-soluble polymer of propargyl alcohol having a characteristic infrared spectrum for a linear, conjugated polymer containing primary alcohol groups.

Conversion of monomer to polymer is 22%, representing 24 moles of polymer per mole of NiBr$_2$.3H$_2$O and 12 moles of polymer per mole of NaBH$_4$.

EXAMPLE 24

To a 500-ml., 3-necked flask, equipped as previously described, are added 200 ml. of DMF and 30.6 g. (0.3 mole) of phenylacetylene. One gram (0.004 mole) of nickel chloride hexahydrate is dissolved in the solution, and then the polymerization is initiated by a rapid addition of 0.5 g. (0.013 mole) of finely-divided sodium borohydride.

The product is DMF soluble, and amounts to 15 g. It is isolated by evaporation of the DMF. The infrared spectrum is consistent with that of a linear polymer of phenylacetylene containing conjugated bonds in the polymer chain.

This represents a yield of 37.5 moles of polymer per mole of $NiCl_2.6H_2O$ and 12.5 moles per mole of $NaBH_4$.

Instead of adding the sodium borohydride as a finely-divided solid, it may be added in the form of a 2% solution in DMF.

EXAMPLE 25

300 ml. of dimethylformamide is saturated with acetylene (6.4 g., 0.246 m.) at room temperature (20°–30° C.). To this solution are added 10.2 g. phenyl-acetylene (0.1 m.) and 2.37 g. $NiCl_2.6H_2O$ (0.01 m.). The mixture is stirred at room temperature while 0.01 mole of $NaBH_4$ in solution in 25 ml. DMF is next added. The reaction mass turns dark, but the product is soluble in the reaction solvent.

The product is isolated by evaporation of the DMF under vacuum. The residue (8 g.) is a black, waxy solid having an infrared spectrum consistent with that of a linear polymer containing phenyl groups. It is different from the spectrum of either of the possible homopolymers. A further study of this monomer system indicates that this feed yields a copolymer having combined in its molecule 83% acetylene and 17% phenylacetylene. The yield of 8 g. corresponds to 26.8 moles of copolymer per mole $NiCl_2.6H_2O$ and to 26.8 moles of copolymer per mole of $NaBH_4$.

EXAMPLE 26

To a 500-ml., 3-necked flask at room temperature, equipped with exit tube, thermometer, $N_2$ sweeping tube and stirrer, are added 200 ml. DMF, 4 g. $NiCl_2.6H_2O$ (0.016 mole), 5 g. of acetylene (0.192 mole) and 5.55 g. (0.1 mole) of N,N-diethylamino-2-propyne (N,N-diethylamino-methylacetylene). One gram of sodium borohydride is added as a 10% solution in DMF. The temperature rises to 80° C. in one minute. It is stirred until the reaction mass cools to room temperature (about 20°–30° C.), requiring about one hour. The reaction mass is then poured into one liter of water. The resulting brown precipitate is filtered off and dried. The product, amounting to 8 g., is a hard, black solid, which is soluble in aqueous mineral acid, more particularly HCl. It has an equivalent weight of 164.5, i.e., a possible structure would be:

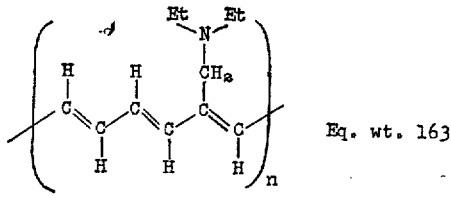

Eq. wt. 163

EXAMPLE 27

To a 2-liter, stirred reaction vessel containing 700 ml. of tetrahydrofuran saturated with acetylene, which solution is at a tempertaure of about 30° C., is added 14.7 g. (0.015 mole) of a commercially available cobalt naphthenate catalyst (6% cobalt in an inert hydrocarbon) which is completely miscible with the tertrahydrofuran. Finely-divided, solid sodium borohydride (2.83g.; 0.075 mole) is then added to the reaction mixture. There is a rapid exotherm which soon subsides to about 35° C., and the reaction mass is stirred for 30 minutes longer. The product is collected on a funnel, and after being washed as in Example 1 it is dried in vacuo. There is obtained 20.3 g. of polyacetylene having the characteristic I.R. spectrum. This yield corresponds to 52 moles of acetylene polymerized per mole of cobalt salt and 10.5 moles of acetylene polymerized per mole of sodium borohydride.

EXAMPLE 28

Employing the procedure of Example 1, and using tetrahydrofuran as the solvent, a polymerization of acetylene is carried out at 65° C. The yield at this reaction temperature is only 5.5 g. compared with a yield of 26.8 g. at 30° C. and under otherwise comparable conditions.

In a like test at 100° C., using dimethylformamide as the solvent, the yield of polyacetylene is 6.7 g. This compares with a yield of 27.5 g. at 30° C. with otherwise comparable conditions.

EXAMPLE 29

This example illustrates the homopolymerization of phenylpropargyl ether.

Into 80 ml. of acetone at 25° C. in a 200 ml., three-necked flask equipped with stirrer and tubes for gas inlet and outlet are placed 10 g. (0.075 mole) of phenylpropargyl ether and 0.82 g. (0.003 mole) of $NiBr_2.3H_2O$, and which are dissolved in the acetone with stirring. A solution of 0.25 g. (0.007 mole) of $NaBH_4$ in 10 ml. of ethanol is next added at once, while stirring. The mixture turns black, and the resulting exothermic reaction raises the temperature to 60° C. within 30 seconds. The reaction subsides quickly, and the temperature drops to 40° C. at the end of three minutes.

Evaporation of the acetone leaves 9 g. of thick, black, oily product which is soluble in benzene, and has an I.R. spectrum consistent with that of a linear polymer of phenylpropargyl ether. This yield represents 90% conversion of monomer to polymer, and a yield of 22.7 moles of polymer per mole of $NiBr_2.3H_2O$ and of 9.7 moles of polymer per mole of $NaBH_4$.

EXAMPLE 30

This example illustrates the copolymerization of acetylene and phenylpropargyl ether.

Into 300 ml. of acetone in a 1-liter, three-necked flask, equipped with a fitted gas-delivery tube, stirrer, and Dry Ice-cooled condenser, are placed 0.82 g. (0.003 mole) of $NiBr_2.3H_2O$ and 13.2 g. (0.1 mole) of phenylpropargyl ether. The reaction mixture is cooled in an ice bath while acetylene is added until the weight gain is 11 g. (0.423 mole). A solution of 0.5 g. (0.013 mole) of $NaBH_4$ dissolved in 25 ml. of ethanol is next added.

The reaction proceeds immediately, with exotherm to the boiling point of the solvent, and formation of a black color. Isolation of the product results in 16 g. of a thick, black, polymeric material. The I.R. spectrum indicates increased aliphatic C–H intensity at 2950 cm.$^{-1}$, and increased absorption at 1015 cm.$^{-1}$ when compared to the homopolymer of phenylpropargyl ether. The product appears to be homogeneous, and is soluble in DMF and benzene. These observations, in addition to the weight of the product which is greater than that of either monomer, indicate that the product is a copolymer of acetylene and phenylpropargyl ether.

Instead of phenylpropargyl ether as a comonomer with acetylene one can use, in any proportions, any other polymerizable compound having acetylenic unsaturation between adjacent carbon atoms including the mono-substituted acetylenes embraced by Formula I, numerous examples of which have been given hereinbefore. If desired, ethylenic compounds and/or compounds containing both ethylenic and acetylenic unsaturation can be added to the liquid reaction medium together with the acetylene, and the mixture of polymerizable materials

EXAMPLE 31

This example illustrates the homopolymerization of 2-methyl-3-butyn-2-ol. The same procedure is followed as described under Example 29 with the exception that the metallic salt is $Ni(NO_3)_2 \cdot 6H_2O$.

Into 50 ml. of acetone are placed 1 g. of $$Ni(NO_3)_2 \cdot 6H_2O$$

(~0.003 mole) and 10 g. (0.119 mole) of 2-methyl-3-butyn-2-ol. Addition of 0.2 g. (0.052 mole) of $NaBH_4$ produces an exotherm of 10° C. The product is dark brown, tacky and solid at room temperature. It weighs 4 g., i.e., 40% conversion of monomer to polymer, or a yield of 14.9 moles of polymer per mole of $$Ni(NO_3)_2 \cdot 6H_2O$$

EXAMPLE 32

This example illustrates the copolymerization of acetylene and 2-methyl-3-butyn-2-ol. Essentially the same procedure is followed as described under Example 30 with the exception that the metallic salt is $$Ni(NO_3)_2 \cdot 6H_2O$$

Acetylene is added to 1 liter of acetone until the weight gain is 32 g. (1.23 moles). Two and nine-tenths grams of $Ni(NO_3) \cdot 6H_2O$ (0.01 mole) are added, and 16.8 g. (0.2 mole) of 2-methyl-3-butyn-2-ol. One hundredth mole of $NaBH_4$ is added in 20 ml. of ethanol. The reaction mixture exotherms from 6° to 17° C., and exhibits the characteristic polymerization color.

The purified product consists of 10.5 g., of which a small amount (1.5 g.) is DMF insoluble, and exhibits only the 1015 cm.$^{-1}$ absorption in the infrared that is typical of polyacetylene. The DMF-soluble portion exhibits a strong increase in the region of 1005 cm.$^{-1}$ in addition to the expected tertiary alcohol peaks, and is obviously a copolymer, i.e., the expected copolymer of acetylene and 2-methyl-3-butyn-2-ol.

EXAMPLE 33

This example illustrates the homopolymerization of monovinylacetylene.

Monovinylacetylene is added to 200 ml. of acetone at 0° C. until the weight pick-up is 10 g. One gram (0.0034 mole) of $Ni(NO_3)_2 \cdot 6H_2O$ is dissolved in the resulting liquid mass, and the polymerization is initiated by next adding 0.2 g. (0.052 mole) of $NaBH_4$ in 10 ml. of ethanol. The mixture exotherms at 10° C. The brown, acetone-insoluble product weighs 2 g. Its I.R. spectrum shows no absorption bands characteristic of cyclic products. It exhibits the characteristic vinyl peaks at 905 and 995 cm.$^{-1}$, and broad conjugated olefinic absorption at 1600 to 1650 cm.$^{-1}$.

EXAMPLE 34

This example illustrates the homopolymerization of hexyne-1. The procedure is the same as that employed in Example 29 except for the proportion of reactants.

Into 100 ml. of DMF swept with $N_2$ are placed 5 g. (0.061 mole) of hexyne-1 and 0.89 g. (0.0037 mole) of $NiCl_2 \cdot 6H_2O$. To the stirred mixture is added 0.315 g. (0.008 mole) of $NaBH_4$ as a 3.5% solution in DMF. Evaporation of the solvent in vacuo, extraction of the residue with hexane, and subsequent evaporation yields 1.5 g. of a black, oily tar, which is a polymer of hexyne-1. It is established as being a linear polymer by I.R. examination. The yield of 1.5 g. corresponds to 4.86 moles of polymer per mole $NiCl_2 \cdot 6H_2O$, and to 2.3 moles of polymer per mole $NaBH_4$.

EXAMPLE 35

This example illustrates the homopolymerization of propargyl acetate. The procedure is essentially the same as that used in Example 29 except for the proportion of reactants.

Into 100 ml. of DMF are placed 7 g. (0.0714 mole) of propargyl acetate and 1 g. (0.0042 mole) of $$NiCl_2 \cdot 6H_2O$$

The polymerization of the monomer is initiated by adding a DMF solution of 0.1 g. (0.0026 mole) of $NaBH_4$.

The reaction is moderately exothermic, i.e., to the extent of 10° C., and the product (1.5 g.) is a dark brown, oily tar, which is a polymer of propargyl acetate. Infrared examination establishes it to be a linear polymer. The yield of 1.5 g. of polymer corresponds to 5.9 moles per mole $NaBH_4$ and to 3.6 moles per mole $NiCl_2 \cdot 6H_2O$.

EXAMPLE 36

This example illustrates the importance of the minimum temperature of reaction in forming the catalytic species which promotes the polymerization of the acetylenic compound.

A stock solution of DMF which is 2.5 molar with respect to acetylene and 0.005 molar with respect to $NiCl_2 \cdot 6H_2O$ is prepared. The solution is distributed among several test tubes, each of which is immersed in a bath to provide a constant (±3° C.) temperature. Each contains 20 ml. of the stock solution. Into each of the test tubes is then pipetted 2.0 ml. of a 4% sodium borohydride solution. The following results are observed.

| Test Tube No. | Temp., °C. | Initiation period |
| --- | --- | --- |
| 1 | −78 | >24 hours. |
| 2 | −40 | >24 hours. |
| 3 | −20 | ca 2–3 hours. |
| 4 | −5 | ca 10 minutes. |
| 5 | +15 | <5 minutes. |

We claim:

1. The method of polymerizing a polymerizable acetylenic compound having the general formula:

$$R—C \equiv C—H$$

wherein R is a member selected from the group consisting of hydrogen, alkyl, alkenyl, aralkyl, aryl and alkaryl, comprising distributing said polymerizable compound and at least one metallic salt selected from the group consisting of nickel salts and cobalt salts, in a liquid reaction medium selected from the group consisting of water and organic solvents, adding to and incorporating in the resulting liquid mass an alkali-metal borohydride, wherein said polymerizable compound, metallic salt and borohydride are each at least partially soluble in said liquid reaction medium and wherein the addition of the alkali-metal borohydride into said liquid mass is completed before any appreciable polymerization of said polymerizable compound has occurred, thereafter allowing the polymerization of the said polymerizable compound to proceed to completion at a temperature above −20° C.

2. A method according to claim 1 wherein the compound having acetylenic unsaturation is a monosubstitute acetylene having the general formula:

$$R—C \equiv C—H$$

wherein R is a member selected from the group consisting of alkyl, alkenyl, aralkyl, aryl and alkaryl.

3. A method according to claim 1 wherein the polymerizable material is a mixture of acetylene and a monosubstituted acetylene having the general formula:

$$R—C \equiv C—H$$

wherein R is a member selected from the group consisting of alkyl, alkenyl, aralkyl, aryl and alkaryl.

4. A method as in claim 1 wherein the compound having acetylenic unsaturation between adjacent carbon atoms is acetylene.

5. A method as in claim 2 wherein the mono-substituted acetylene is phenylacetylene.

6. A method as in claim 2 wherein the mono-substituted acetylene is propargyl alcohol.

7. A method as in claim 3 wherein the polymerizable material is a mixture of acetylene and phenylacetylene.

8. A method as in claim 3 wherein the polymerizable material is a mixture of acetylene and propargyl alcohol.

9. A method as in claim 3 wherein the polymerizable material is a mixture of acetylene and 2-methyl-3-butyn-2-ol.

10. A method as in claim 1 wherein the metallic salt is a nickel salt.

11. A method as in claim 1 wherein the alkali-metal borohydride is sodium borohydride.

12. A method as in claim 1 wherein the liquid, reaction medium in which the polymerizable material is distributed is dimethylformamide.

13. A method as in claim 1 wherein the liquid, reaction medium in which the polymerizable material is distributed is N-methyl-2-pyrrolidone.

14. A method as in claim 1 wherein the liquid, reaction medium in which the polymerizable material is distributed is dimethylformamide and the metallic salt is nickel chloride.

15. A method as in claim 1 wherein the temperature of the reaction mass containing the polymerizable material, metallic salt and alkali-metal borohydride during the polymerization reaction is within the range of from about $-10°$ C. to about $+60°$ C.

16. A method as in claim 1 wherein the metallic salt is employed in a molar quantity corresponding to at least $1/1000$ of the molar amount of the compound containing acetylenic unsaturation between adjacent carbon atoms which is present in the liquid, reaction medium.

17. A method as in claim 1 wherein the metallic salt is nickel chloride and the molar amount thereof is within the range of not less than $1/1000$ and not more than $1/50$ of the molar amount of the compound having acetylenic unsaturation between adjacent carbon atoms which is present in the liquid, reaction medium.

18. A method as in claim 1 wherein the alkali-metal borohydride is sodium borohydride, the metallic salt is nickel chloride, and the sodium borohydride:nickel chloride molar ratio is between 2:1 and 1:100.

19. A method as in claim 1 wherein the liquid, reaction medium in which the polymerizable material is distributed is acetone and the metallic catalyst is an acetone-soluble nickel salt.

20. The method of polymerizing acetylene comprising dissolving acetylene and nickel chloride in a solvent consisting of at least one member of the group consisting of liquid water and liquid organic solvents; adding to the resulting solution a solution of sodium borohydride, said nickel chloride and said borohydride being soluble in the solvent in which the said acetylene is dissolved, and the addition of the sodium borohydride solution to the solution containing the said nickel chloride and the said acetylene being completed before any appreciable polymerization of the said acetylene has occurred; and thereafter allowing the polymerization of the said acetylene to proceed to completion at a temperature within the range of from $0°$ C. to $+60°$ C.

References Cited in the file of this patent

UNITED STATES PATENTS

| | | |
|---|---|---|
| 2,728,757 | Field et al. | Dec. 27, 1955 |
| 2,728,758 | Field et al. | Dec. 27, 1955 |
| 2,773,053 | Field et al. | Dec. 4, 1956 |

UNITED STATES PATENT OFFICE
CERTIFICATE OF CORRECTION

Patent No. 3,092,613　　　　　　　　　　　　　June 4, 1963

George W. Kennerly et al.

It is hereby certified that error appears in the above numbered patent requiring correction and that the said Letters Patent should read as corrected below.

Column 1, lines 57 and 68, for "polymeriable", each occurrence, read -- polymerizable --; lines 65 and 67, for "polymeriation", each occurrence, read -- polymerization --; column 4, line 40, for "ispropanol" read -- isopropanol --; column 5, line 9, for "acetylenes," read -- acetylenes), --; column 7, line 39, for "$NiCl_2.NH_2O$" read -- $NiCl_2.6H_2O$ --; line 51, before "to" insert -- and --; same column 7, lines 68 and 69, for "follower" read -- followed --.

Signed and sealed this 11th day of February 1964.

(SEAL)

Attest:

ERNEST W. SWIDER

Attesting Officer

EDWIN L. REYNOLDS

Acting Commissioner of Patents